United States Patent
Sakai (10) Patent No.: US 11,231,400 B2
(45) Date of Patent: Jan. 25, 2022

(54) COLUMN ATTACHING METHOD AND HEATING DEVICE

(71) Applicant: SHIMADZU CORPORATION, Kyoto (JP)

(72) Inventor: Takero Sakai, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 15/985,772

(22) Filed: May 22, 2018

(65) Prior Publication Data

US 2018/0340918 A1 Nov. 29, 2018

(30) Foreign Application Priority Data

May 23, 2017 (JP) .............................. JP2017-102178

(51) Int. Cl.
| | |
|---|---|
| *G01N 30/60* | (2006.01) |
| *G01N 30/68* | (2006.01) |
| *G01N 30/30* | (2006.01) |
| *G01N 30/02* | (2006.01) |

(52) U.S. Cl.
CPC ......... *G01N 30/6004* (2013.01); *G01N 30/68* (2013.01); *G01N 30/30* (2013.01); *G01N 30/6047* (2013.01); *G01N 2030/025* (2013.01); *G01N 2030/3084* (2013.01)

(58) Field of Classification Search
None
See application file for complete search history.

(56) References Cited

U.S. PATENT DOCUMENTS

| | | | |
|---|---|---|---|
| 5,289,003 A * | 2/1994 | Musser | G01N 30/7253 250/281 |
| 2003/0003595 A1* | 1/2003 | Amirav | G01N 30/72 436/173 |
| 2013/0256523 A1* | 10/2013 | Steiner | H01J 49/04 250/282 |

FOREIGN PATENT DOCUMENTS

| | | |
|---|---|---|
| CN | 101116963 A | 2/2008 |
| CN | 101332674 A | 12/2008 |
| CN | 103226134 A | 7/2013 |
| JP | 3-264059 A | 11/1991 |
| JP | 2013-156154 A | 8/2013 |

OTHER PUBLICATIONS

Machine Translation JP2013156154. (Year: 2013).*
Communication dated Jan. 10, 2020 from the State Intellectual Property Office of the P.R.C. in Application No. 201810479550.4.

* cited by examiner

*Primary Examiner* — Kara M Peo
(74) *Attorney, Agent, or Firm* — Sughrue Mion, PLLC

(57) ABSTRACT

When a column is attached to an attachment location, first, a ferrule through which the column is inserted is heated and thus is fixed to the column. Then, the column to which the ferrule is fixed is attached to the attachment location. As described, when a user performs work of attaching the column to the attachment location, the ferrule is always fixed to a certain spot of the column. Therefore, it is possible to omit work of holding the ferrule such that the position of the ferrule with respect to the column does not shift when the work of attaching the column is performed. As a result, the column can be easily attached to the attachment location.

8 Claims, 11 Drawing Sheets

COLUMN ATTACHING METHOD AND HEATING DEVICE

BACKGROUND OF THE INVENTION

Field of the Invention

The present invention relates to a column attaching method for attaching a column to an attachment location, and a heating device used in the column attaching method.

Description of the Related Art

A gas chromatograph includes a column accommodated in a column oven, a sample introducing unit, and a detector. The sample introducing unit and the detector are provided on an upper wall of the column oven. The column is disposed in the column oven such that one end portion of the column is connected to the sample introducing unit and the other end portion of the column is connected to the detector.

The column of a type corresponding to the purpose of an analysis is selected and used. In addition, during maintenance, the column is removed from the column oven (the sample introducing unit and the detector). As described, the column is appropriately attached to and detached from the sample introducing unit and the detector.

When the column is attached to the sample introducing unit and the detector, a ferrule and a nut are provided at each of both the end portions of the column. Then, the nut is fastened to each of the sample introducing unit and the detector, and thus the ferrule is pressed and tightly fitted to the column. Further, when the inside of the column oven is heated, the ferrule is fixed to the column by welding. Thus, the column and the sample introducing unit are fixed to each other in a sealed state with the ferrule interposed therebetween, and the column and the detector are fixed to each other in a sealed state with the ferrule interposed therebetween (see, for example, JP-A-2013-156154).

In this manner, by fixing both the end portions of the column to the sample introducing unit and the detector with the ferrules interposed therebetween, the column can be easily fixed to the sample introducing unit and the detector.

SUMMARY OF THE INVENTION

In the case of fixing the column as described above, the length from the column front end to the ferrule needs to be kept constant.

Figure 5A:
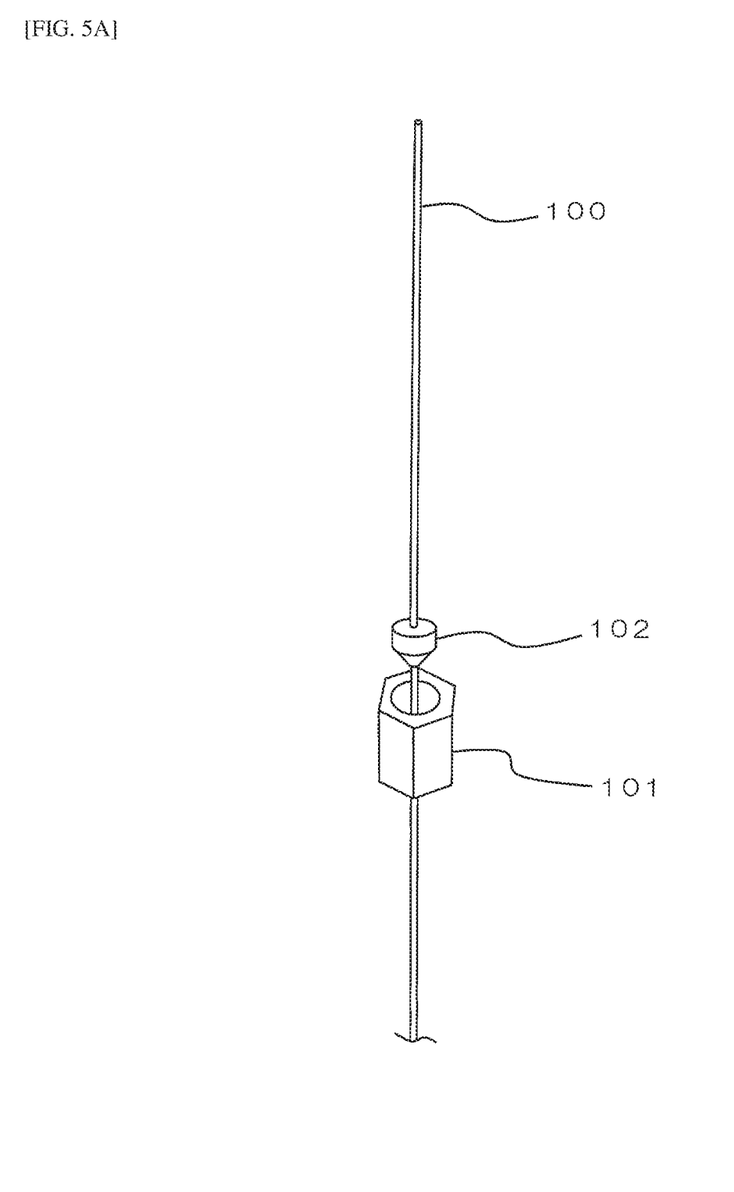
FIG. 5A is a view for explaining column length adjustment procedures in a conventional column attaching method, and illustrates a state where a front end portion of a column is inserted through a nut and a ferrule.
Figure 5B:
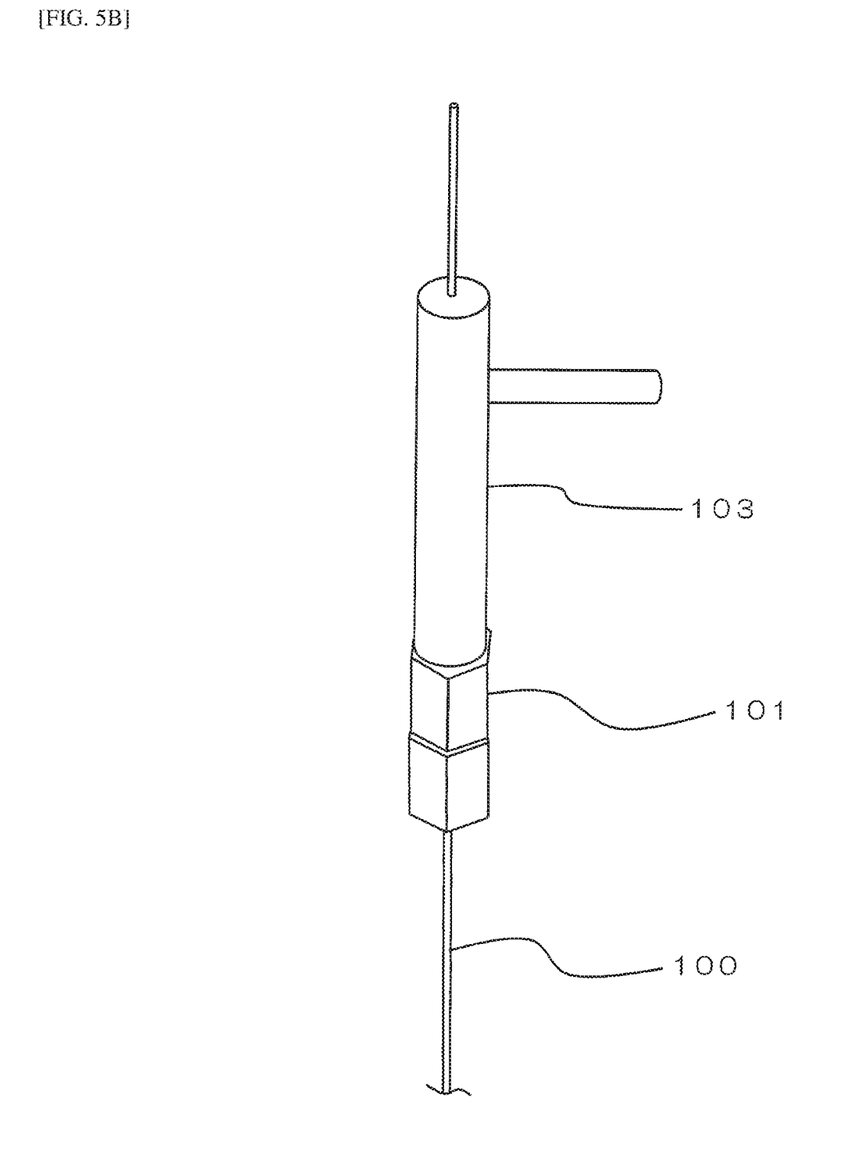
FIG. 5B is a view for explaining the column length adjustment procedures in the conventional column attaching method, and illustrates a state where a length adjusting tool is provided on the front end portion of the column.
Figure 5C:
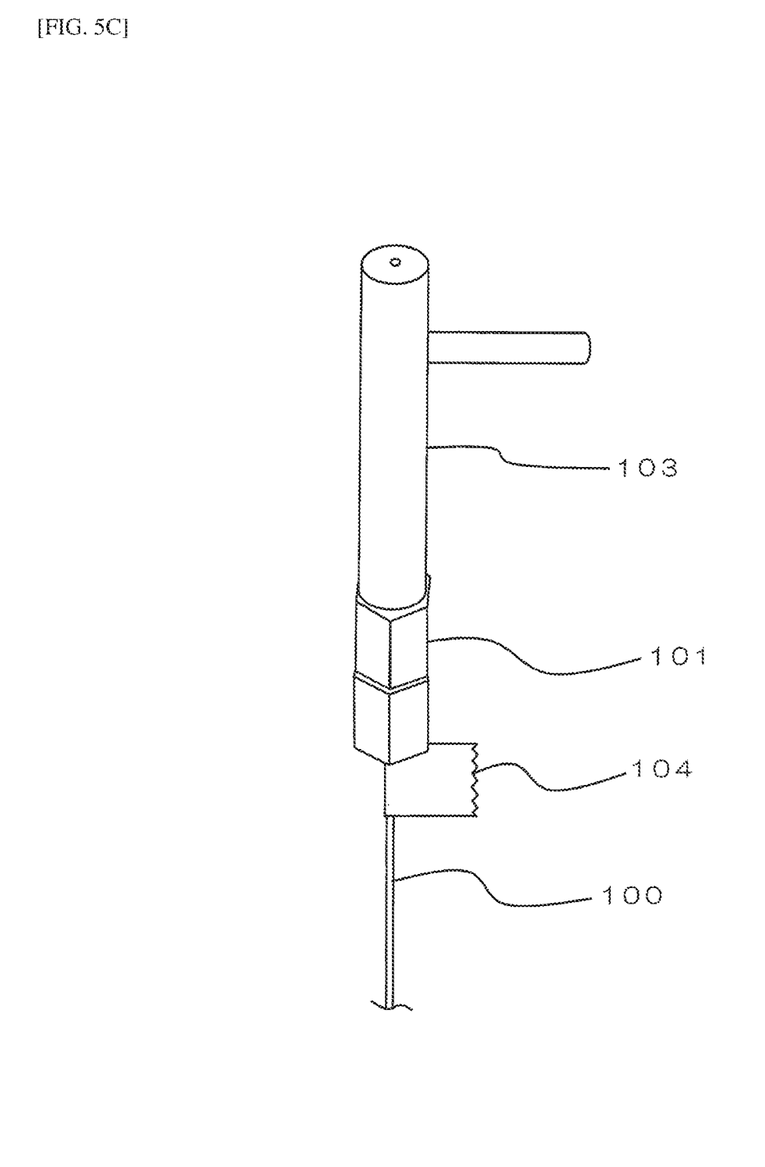
FIG. 5C is a view for explaining the column length adjustment procedures in the conventional column attaching method, and illustrates a state where the front end portion of the column is cut.
Figure 5D:
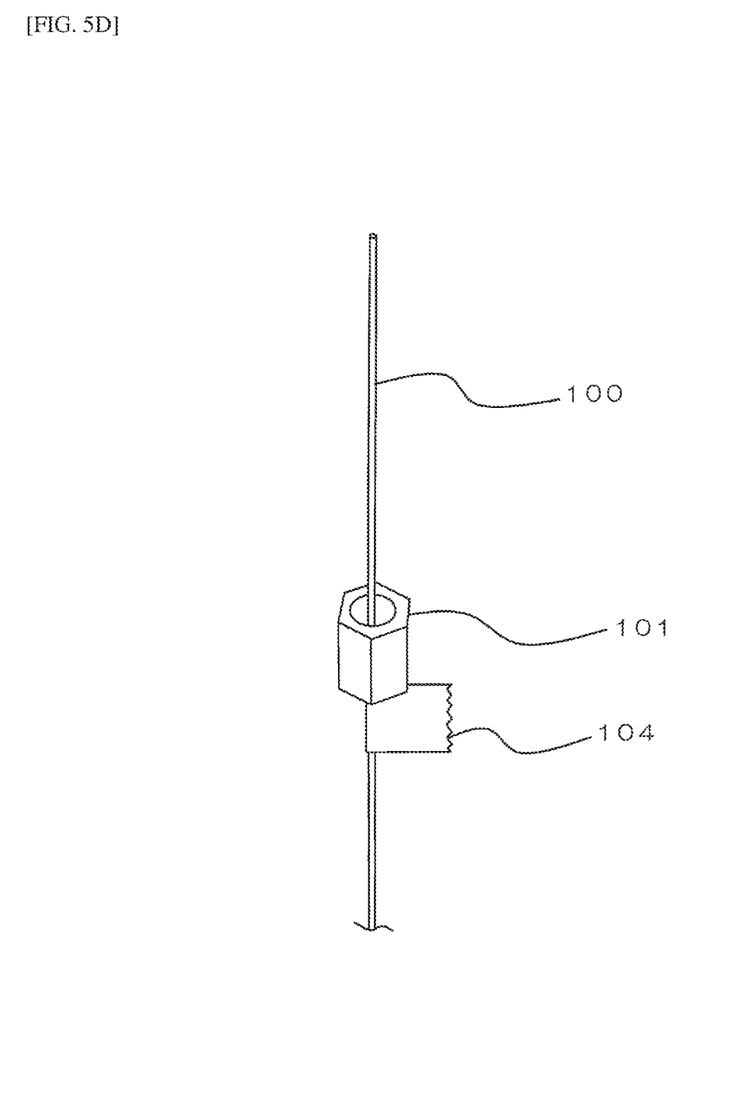
FIG. 5D is a view for explaining the column length adjustment procedures in the conventional column attaching method, and illustrates a state where the length adjusting tool is removed from the front end portion of the column.

FIGS. 5A to 5D are views for explaining length adjustment procedures of a column 100 in a conventional column attaching method. Specifically, FIG. 5A illustrates a state where a front end portion of the column 100 is inserted through a nut 101 and a ferrule 102. FIG. 5B illustrates a state where a length adjusting tool 103 is provided at the front end portion of the column 100. FIG. 5C illustrates a state where the front end portion of the column 100 is cut. FIG. 5D illustrates a state where the length adjusting tool 103 is removed from the front end portion of the column 100.

In the conventional method, as illustrated in FIG. 5A, a user first inserts front end portions (both end portions) of the column 100 through the nut 101 and the ferrule 102. At this time, the ferrule 102 is located on a front end side of the column 100 with respect to the nut 101. Then, the user moves the ferrule 102 toward the nut 101 along the column 100, and places the ferrule 102 in the internal space of the nut 101.

Next, as illustrated in FIG. 5B, the user inserts the front end portion of the column 100 through the length adjusting tool 103. The length adjusting tool 103 has a cylindrical shape with a fixed length. One end portion (lower end portion) of the length adjusting tool 103 is formed like a bolt to be engaged with the nut 101. Then, the user fastens the nut 101 to the length adjusting tool 103. As a result, inside the nut 101, the ferrule 102 is pressed by the inner surface of the nut 101 and the lower end surface of the length adjusting tool 103 so as to be tightly fitted to the column 100.

Then, as illustrated in FIG. 5C, the user cuts off the portion of the column 100 protruding from the length adjusting tool 103. In addition, the user attaches a tape 104 to the column 100 such that the tape 104 is positioned at one end edge (lower edge) of the nut 101. Then, as illustrated in FIG. 5D, the user removes the length adjusting tool 103 from the nut 101.

In this manner, the length of the column 100 is adjusted. The tape 104 indicates the length of the front end portion of the column 100 after the length has been adjusted. Note that FIGS. 5A to 5D only illustrate states where the length of one end portion of the column 100 is adjusted; however, the length of the other end portion of the column 100 is similarly adjusted.

Then, the user attaches the nut 101 to the sample introducing unit and the detector. Thus, the column 100 is disposed in the column oven. At this time, the nut 101 is attached to each of the sample introducing unit and the detector so as to be kept positioned along the tape 104.

Then, the user removes the tape 104 from the column 100.

As described, conventionally, the length adjusting tool 103 and the tape 104 are used to dispose the column 100 in the column oven in a state where the length of the front end portion is kept constant.

However, with such a method, when the column 100 is attached to the sample introducing unit and the detector, there is a problem that work of a user becomes complicated.

Specifically, as illustrated in FIG. 5D, when the length adjusting tool 3 is removed from the nut 101, the pressed state of the ferrule 102 is released. Therefore, the ferrule 102 moves with respect to the column 100. The nut 101 also moves with respect to the column 100. As a result, the user has to attach the nut 101 which moves with respect to the column 100 to each of the sample introducing unit and the detector while holding the nut 101 such that the nut 101 is positioned along the tape 104. Therefore, there is a problem that attachment work becomes complicated.

The present invention has been made in view of the above circumstances. An object of the present invention is to provide a column attaching method capable of easily attaching a column to an attachment location, and a heating device used in the column attaching method.

(1) A column attaching method according to the present invention includes an inserting step, a heating step, and an attaching step. In the inserting step, a column is inserted through a ferrule. In the heating step, the ferrule through which the column is inserted is heated to be fixed to the column. In the attaching step, the column to which the ferrule is fixed is attached to an attachment location.

According to such a method, the ferrule through which the column is inserted is fixed to the column by being heated. Then, the column to which the ferrule is fixed is attached to the attachment location. That is, when a user performs work of attaching the column to the attachment location, the ferrule is always fixed to a certain spot of the column.

Therefore, it is possible to omit work of holding the ferrule such that the position of the ferrule with respect to the column does not shift during the work of attaching the column.

As a result, the column can be easily attached to the attachment location.

(2) In addition, in the heating step, the ferrule may be heated in a state where the ferrule contracts and is tightly fitted to the column.

According to such a method, the ferrule can be reliably fixed to the column.

(3) In addition, the column attaching method may further include a positioning step and an adjusting step. In the positioning step, the ferrule through which the column is inserted is positioned with respect to a length adjusting tool. In the adjusting step, the front end position of the column with respect to the ferrule is adjusted. The ferrule is positioned with respect to the length adjusting tool. In the heating step, the ferrule may be heated before the front end position of the column is adjusted or after the front end position of the column is adjusted.

According to such a method, the length from the ferrule fixed to the column to the front end of the column can be kept constant. Then, the column in that state can be attached to the attachment location.

(4) In addition, in the positioning step, the ferrule may be sandwiched and positioned between the length adjusting tool and a nut by fastening the nut to the length adjusting tool. In the heating step, the ferrule may be heated through the nut.

According to such a method, the ferrule can be positioned by a simple operation of fastening the nut to the length adjusting tool.

In addition, since the ferrule is heated through the nut, the ferrule can be heated and fixed while the ferrule is kept positioned.

Therefore, it is possible to fix the ferrule at an appropriate position.

(5) A heating device according to the present invention is a heating device used in the column attaching method. The heating device includes a heating unit having a shape corresponding to the shape of the nut.

With such a configuration, the nut can be heated by the heating unit of the heating device in a state where the heating unit is tightly fitted to the nut.

Therefore, the nut can be efficiently heated by the heating device.

(6) A heating device according to the present invention is a heating device used in the column attaching method. The heating device includes a main body and a heating unit. In the main body, an insertion hole into which the column is inserted is formed. The heating unit is provided in the main body, and heats the ferrule in a state where the column is inserted through the ferrule, the column being inserted in the insertion hole.

According to such a configuration, the heating unit heats the ferrule in a state where the column inserted through the ferrule is inserted in the insertion hole of the main body. Thus, the ferrule can be fixed to the column.

Therefore, the ferrule can be fixed to the column with a simple operation.

According to the present invention, it is possible to omit the work of holding the ferrule such that the position of the ferrule with respect to the column does not shift during column attaching work. As a result, the column can be easily attached to the attachment location.

DETAILED DESCRIPTION OF THE PREFERRED EMBODIMENTS

1. Configuration of Gas Chromatograph

Figure 1:
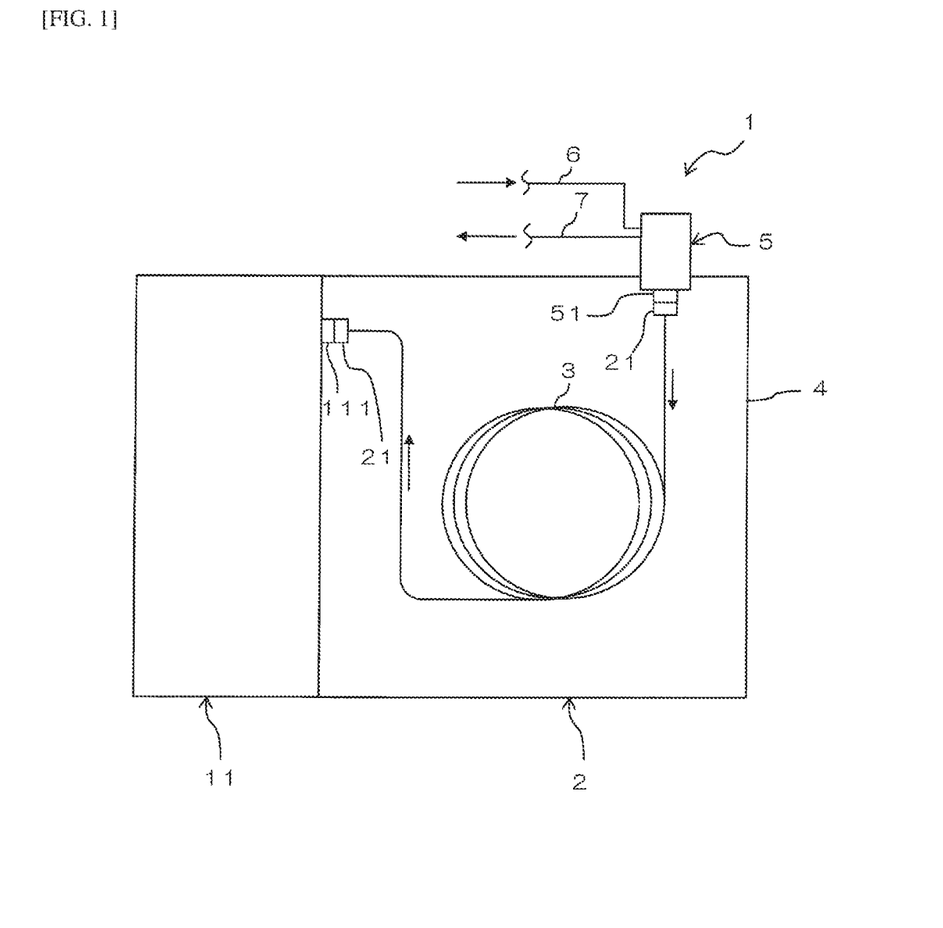
FIG. 1 is a schematic view illustrating a configuration example of a gas chromatograph mass spectrometer including a column attached to attachment locations by a column attaching method according to a first embodiment of the present invention.

FIG. 1 is a schematic view illustrating a configuration example of a gas chromatograph mass spectrometer 1 including a column 3 attached to attachment locations by a column attaching method according to a first embodiment of the present invention.

The gas chromatograph mass spectrometer 1 includes a gas chromatograph unit 2 and a mass spectrometry unit 11.

The gas chromatograph unit 2 includes the column 3, a column oven 4, a sample introducing unit 5, and the like.

The column 3 is configured of, for example, a capillary column. The column 3 is accommodated in the column oven 4 together with a heater, a fan, and the like (none of which are illustrated). The column 3 is attached to the attachment locations by an attaching method to be described later.

The column oven 4 is configured to heat the column 3. The heater and the fan are appropriately driven during an analysis.

The sample introducing unit 5 is configured to introduce a carrier gas and a sample gas into the column 3. A sample vaporizing chamber (not illustrated) is formed in the sample introducing unit 5. A liquid sample is injected in this sample vaporizing chamber, and a sample vaporized in the sample vaporizing chamber is introduced into the column 3 together with the carrier gas. A gas supply flow path 6 and a split flow path 7 communicate with the sample vaporizing chamber. In addition, the sample introducing unit 5 includes a connecting section 51 for connecting to the column 3. The connecting section 51 is provided on an upper wall of the column oven 4.

The gas supply flow path 6 is a flow path for supplying the carrier gas into the sample vaporizing chamber of the sample introducing unit 5.

The split flow path 7 is a flow path for discharging part of gas (mixed gas of the carrier gas and the sample gas) in the sample vaporizing chamber to the outside at a predetermined split ratio when the carrier gas and the sample gas are introduced into the column 3 by using a split injection method.

The mass spectrometry unit 11 includes a vacuum chamber, an ion detector, and the like (none of which are illustrated). During an analysis, each of the sample components separated in the column 3 is guided into the vacuum chamber in a vacuum state. The mass spectrometry unit 11 includes a connecting section 111 for connecting to the column 3. The connecting section 111 is provided on a side wall of the column oven 4.

The column 3 is disposed in the column oven 4 such that one end portion of the column 3 is connected to the connecting section 51 of the sample introducing unit 5 and the other end portion of the column 3 is connected to the connecting section 111 of the mass spectrometry unit 11.

When a sample is analyzed in the gas chromatograph mass spectrometer 1, a sample to be analyzed is injected into the sample introducing unit 5. The sample is vaporized in the sample vaporizing chamber. In addition, the carrier gas is supplied to the sample vaporizing chamber of the sample introducing unit 5 via the gas supply flow path 6.

The sample vaporized in the sample vaporizing chamber is introduced into the column 3 together with the carrier gas. The sample components contained in the sample are separated while the sample passes through the column 3, and are sequentially introduced into the mass spectrometry unit 11.

Then, in the mass spectrometry unit 11, the sample is ionized in the vacuum chamber, and each of the ionized sample components is detected by the ion detector. Mass spectrometry is performed according to the detection result of the ion detector.

In the gas chromatograph mass spectrometer 1 described above, the column 3 is appropriately attached to and detached from the sample introducing unit 5 and the mass spectrometry unit 11. In this example, in order to simplify work of a user, the column 3 is attached to the attachment locations by the following method.

2. Column Attaching Operation

Figure 2A:
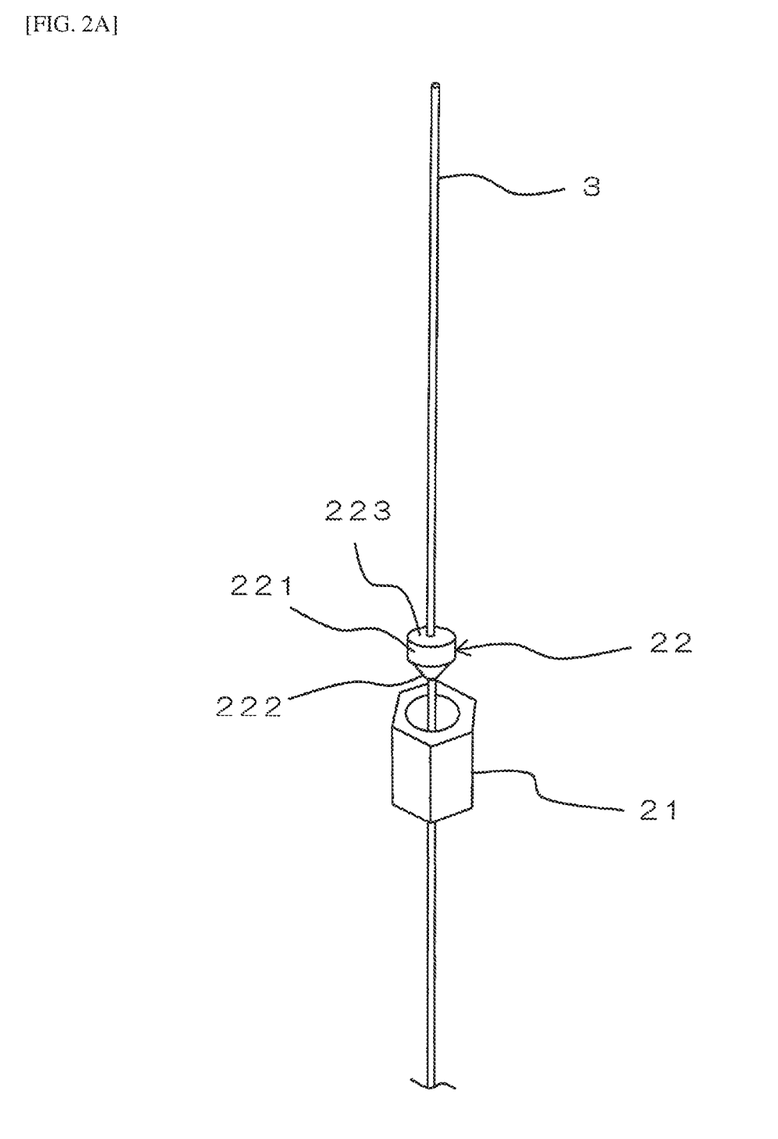
FIG. 2A is a view for explaining the column attaching method according to the first embodiment of the present invention, and illustrates a state where a front end portion of the column is inserted through a nut and a ferrule.
Figure 2B:
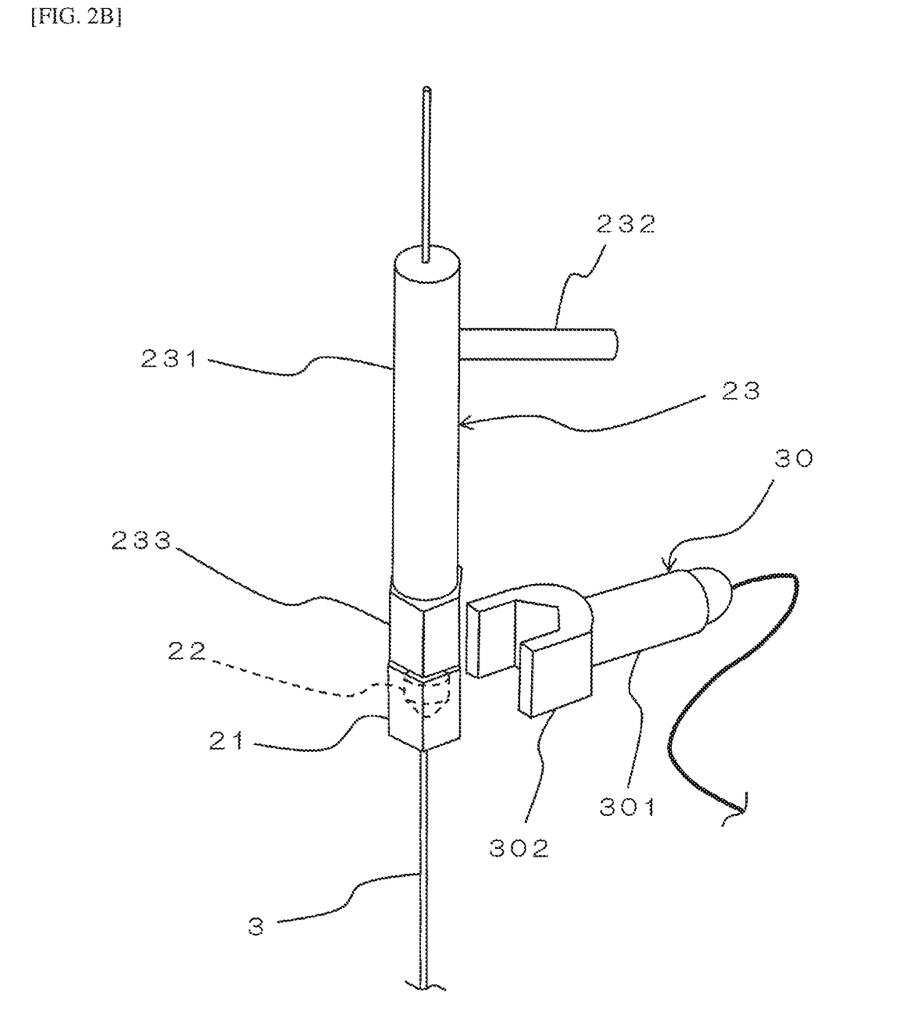
FIG. 2B is a view for explaining the column attaching method according to the first embodiment of the present invention, and illustrates a state where a length adjusting tool is provided at the front end portion of the column.
Figure 2C:
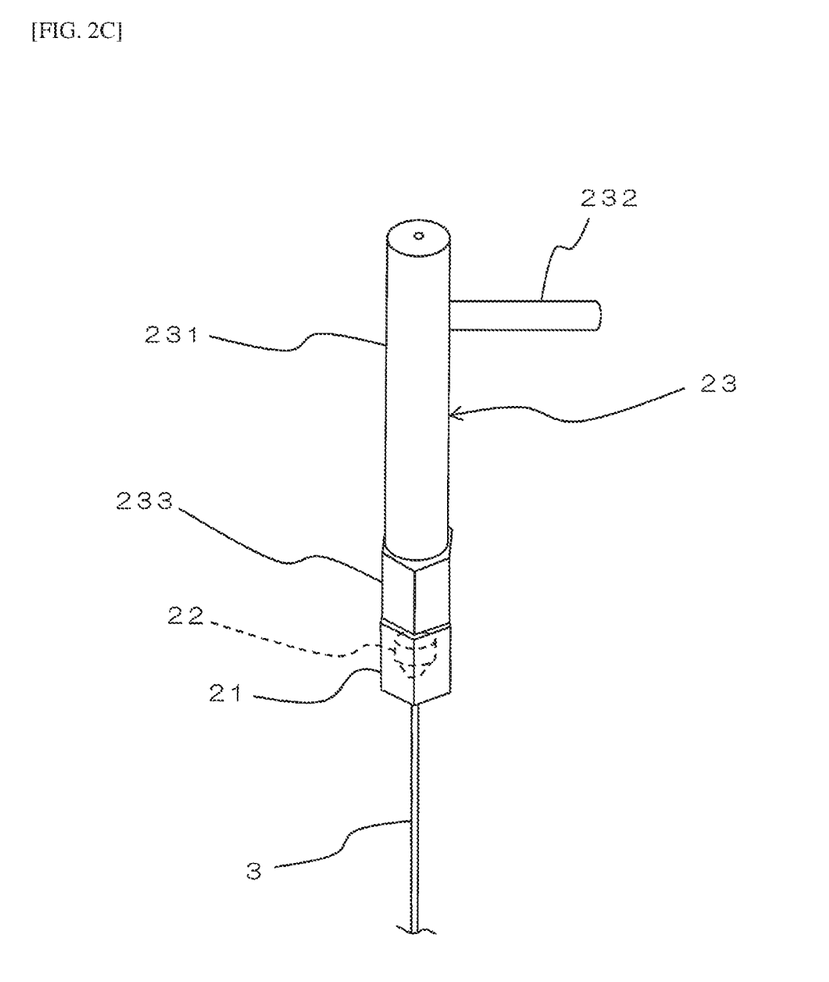
FIG. 2C is a view for explaining the column attaching method according to the first embodiment of the present invention, and illustrates a state where the front end portion of the column is cut.
Figure 2D:
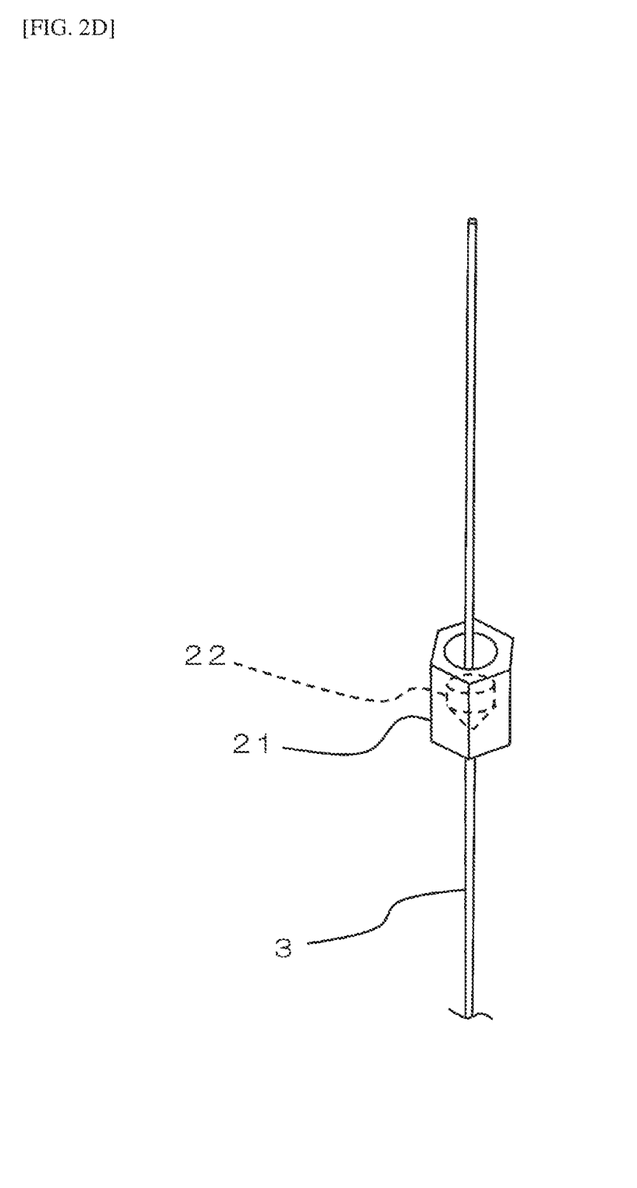
FIG. 2D is a view for explaining the column attaching method according to the first embodiment of the present invention, and illustrates a state where the length adjusting tool is removed from the front end portion of the column.

FIGS. 2A to 2D are views for explaining the method for attaching the column 3 according to the first embodiment of the present invention. Specifically, FIG. 2A illustrates a state where a front end portion of the column 3 is inserted through a nut 21 and a ferrule 22. FIG. 2B illustrates a state where a length adjusting tool 23 is provided at the front end portion of the column 3. FIG. 2C illustrates a state where the front end portion of the column 3 is cut. FIG. 2D illustrates a state where the length adjusting tool 23 is removed from the front end portion of the column 3.

The method for attaching the column 3 in this example includes: a step (inserting step) of inserting the column 3 through the ferrule 22; a step (positioning step) of positioning the ferrule 22 with respect to the length adjusting tool 23; a step (heating step) of heating the ferrule 22 through which the column 3 is inserted and fixing the ferrule 22 to the column 3; a step (adjusting step) of adjusting the front end position of the column 3 with respect to the positioned ferrule 22; and a step (attaching step) of attaching the column 3 to which the ferrule 22 is attached, to attachment locations (the sample introducing unit 5 and the mass spectrometry unit 11).

In the specific attaching method, as illustrated in FIG. 2A, a user first inserts front end portions (both end portions) of the column 3 through the nut 21 and the ferrule 22 (inserting step). At this time, the ferrule 22 is located on a front end side of the column 3 with respect to the nut 21.

The ferrule 22 is made of, for example, a thermosetting resin such as a polyimide resin. The ferrule 22 has a columnar shape in which an end portion on one side (lower side) is tapered. The ferrule 22 has a peripheral surface 221, a tapered surface 222 continuous with an edge on one side in the axial direction (lower edge) of the peripheral surface 221, and a flat surface 223 continuous with the edge on the other side in the axial direction (upper edge) of the peripheral surface 221. The tapered surface 222 is tapered toward the one side in the axial direction (lower side). The flat surface 223 is parallel to a plane orthogonal to the axial direction. A hole extending in the axial direction is formed in the center portion of the ferrule 22, and the column 3 is inserted through the hole. In a state where the column 3 is inserted through the ferrule 22, the tapered surface 222 is directed toward the nut 21 (faces the nut 21).

Then, the user moves the ferrule 22 toward the nut 21 along the column 3, and places the ferrule 22 in the internal space of the nut 21.

Next, as illustrated in FIG. 2B, the user inserts the front end portion of the column 3 through the length adjusting tool 23. The length adjusting tool 23 has a cylindrical shape with a fixed length. The length adjusting tool 23 includes a cylindrical section 231, a grip section 232, and an engaging section 233. The cylindrical section 231 has a long cylindrical shape. The grip section 232 has a bar shape and extends radially outward from the peripheral surface of the cylindrical section 231. The engaging section 233 extends in the axial direction from one end portion (lower end portion) in the axial direction of the cylindrical section 231. The engaging section 233 is formed like a bolt corresponding to the nut 21. The engaging section 233 includes a large-diameter section 233a and a small-diameter section 233b.

Figure 3:
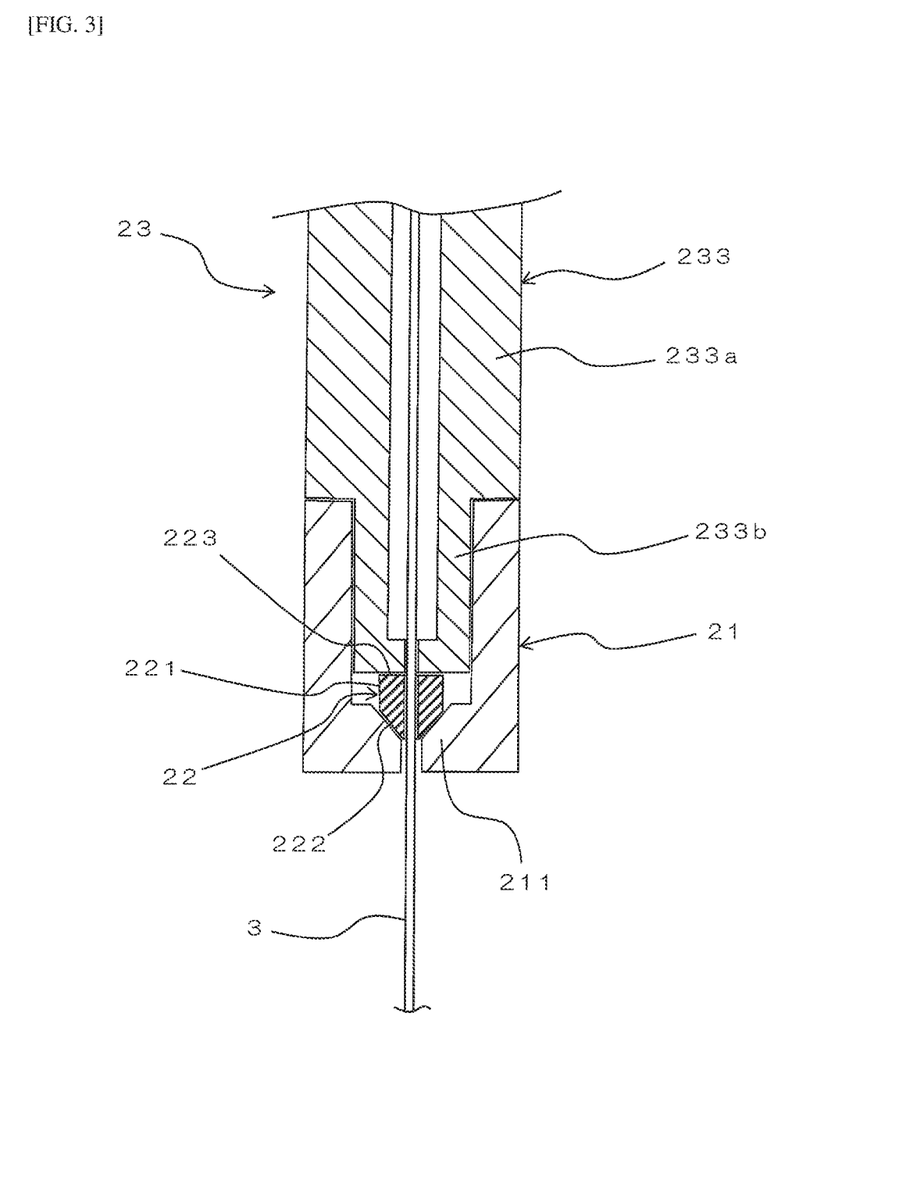
FIG. 3 is a cross-sectional view illustrating a state where the ferrule through which the column is inserted is disposed in an area between the nut and the length adjusting tool.

FIG. 3 is a cross-sectional view illustrating a state where the ferrule 22 through which the column 3 is inserted is disposed in an area between the nut 21 and the length adjusting tool 23.

As illustrated in FIGS. 2B and 3, the large-diameter section 233a is formed into a hollow prism. The small-diameter section 233b continuously extends from the large-diameter section 233a along the axial direction. The small-diameter section 233b is formed in a hollow column. The outer diameter of the small-diameter section 233b is smaller than the outer diameter of the large-diameter section 233a. A thread groove, not illustrated, is formed in the outer peripheral surface of the small-diameter section 233b.

The user moves the length adjusting tool 23 toward the nut 21 along the column 3 to bring the engaging section 233 (the small-diameter section 233b) into contact with the nut 21. Then, while gripping the grip section 232, the user fastens the nut 21 to the length adjusting tool 23 to screw the small-diameter section 233b to the nut 21.

As a result, in the nut 21, the ferrule 22 is pressed by the inner surface of the nut 21 and the small-diameter section 233*b* of the length adjusting tool 103 so as to be tightly fitted to the column 3.

Specifically, as illustrated in FIG. 3, an end surface plate 211 is provided at the lower end portion of the nut 21. A hole is formed at the central portion of the end surface plate 211. A recess is formed in the central portion of the end surface plate 211, and the ferrule 22 is disposed in the recess. The column 3 is inserted through the hole of the end surface plate 211. When the small-diameter section 233*b* of the length adjusting tool 23 is inserted into the nut 21, the flat surface 223 of the ferrule 22 is pressed against the small-diameter section 233*b*, and the tapered surface 222 of the ferrule 22 is tightly fitted to the recess of the end surface plate 211 of the nut 21. Then, the ferrule 22 contracts by being sandwiched between the small-diameter section 233*b* of the length adjusting tool 103 and the end surface plate 211 of the nut 21. Thus, the ferrule 22 is tightly fitted to the column 3.

In this manner, the ferrule 22 through which the column 3 is inserted is positioned with respect to the length adjusting tool 23 (positioning step).

Then, the user uses a heating device 30 to heat the nut 21, as illustrated in FIG. 2B. The heating device 30 includes: a main body 301 containing a supply unit to which electric power is supplied; and a heating unit 302 continuous with the main body 301. The heating unit 302 has a shape corresponding to the shape of the nut 21. Specifically, the heating unit 302 is curved in a U-shape in plan view, and the inner surface of the heating unit 302 has a shape following the outer shape of the nut 21. The heating unit 302 incorporates a heater, not illustrated. By operating the heater, it is possible to heat a member disposed at an inner side of the heating unit 302.

The user causes the heating unit 302 of the heating device 30 to be tightly fitted to the nut 21, and causes the heater of the heating unit 302 to operate while maintaining this state.

As a result, the ferrule 22 is heated through the nut 21 (heating step). At this time, the ferrule 22 is heated, for example, to 200 to 500° C., and preferably to 250 to 450° C. The heating time at this time is, for example, within 5 minutes. When heating of the nut 21 is completed, the user removes the heating device 30 from the nut 21.

Thus, the ferrule 22 is fixed to the column 3 by welding. In this manner, the ferrule 22 is fixed to the column 3 by welding in a state where the ferrule 22 is positioned with respect to the column 3.

Then, as illustrated in FIG. 2C, the user cuts the portion of the column 3 protruding from the length adjusting tool 23 (adjusting step). As a result, the front end position of the column 3 with respect to the ferrule 22 is adjusted. Then, while gripping the grip section 232 of the length adjusting tool 23, the user loosens fastening of the nut 21 to the length adjusting tool 23. Thus, the small-diameter section 233*b* is detached from the nut 21. As illustrated in FIG. 2D, the length adjusting tool 23 is removed from the nut 21 and the column 3.

In this manner, the length of the column 3 is adjusted. Note that FIGS. 2A to 2D only illustrate states where the length of one end portion of the column 3 is adjusted; however, the ferrule 22 is fixed at the other end portion of the column 3 and the length of the other end portion of the column 3 is adjusted in a similar manner.

Although not illustrated, in the method for attaching the column 3 in this example, a plurality of types of length adjusting tools 23 having different lengths is prepared, and the length adjusting tool 23 having an appropriate length according to the attachment location is selected, and the length of the front end portion of the column 3 is adjusted by using the selected length adjusting tool 23. For example, the length of the front end portion of the column 3 attached to the mass spectrometry unit 11 is adjusted so as to be longer than the length of the front end portion of the column 3 attached to the sample introducing unit 5.

Then, the user attaches the nut 21 to each of the connecting section 51 of the sample introducing unit 5 and the connecting section 111 of the mass spectrometry unit 11. Thus, the column 3 is disposed in the column oven 4 (attaching step).

At this time, since the ferrule 22 is fixed to the column 3, the user can easily attach the column 3 to the attachment location without performing work of holding the ferrule 22 such that the position of the ferrule 22 does not shift.

3. Operation and Effect (1) The method for attaching the column 3 according to the present embodiment includes: the step (inserting step) of inserting the column 3 through the ferrule 22; the step (heating step) of heating the ferrule 22 through which the column 3 is inserted and fixing the ferrule 22 to the column 3; and the step (attaching step) of attaching the column 3 to which the ferrule 22 is attached, to the attachment locations (the sample introducing unit 5 and the mass spectrometry unit 11).

That is, the ferrule 22 through which the column 3 is inserted is fixed to the column 3 by being heated. Then, the column 3 to which the ferrule 22 is fixed is attached to the attachment locations (the sample introducing unit 5 and the mass spectrometry unit 11). As described, when the user performs work of attaching the column 3 to the attachment location, the ferrule 22 is always fixed to a certain spot of the column 3.

Therefore, it is possible to omit work of holding the ferrule 22 such that the position of the ferrule 22 with respect to the column 3 does not shift when the work of attaching the column 3 is performed.

As a result, the column 3 can be easily attached to the attachment location.

(2) In addition, in the method for attaching the column 3 in the present embodiment, the ferrule 22 is heated in a state where the ferrule 22 contracts and is tightly fitted to the column 3 during the heating step.

Therefore, the ferrule 22 can be reliably fixed to the column 3.

(3) In addition, the method for attaching the column 3 according to the present embodiment further includes: the step (positioning step) of positioning the ferrule 22 with respect the length adjusting tool 23; and the step (adjusting step) of adjusting the front end position of the column 3 with respect to the positioned ferrule 22.

Therefore, the length from the ferrule 22 fixed to the column 3 to the front end of the column 3 can be kept constant. Then, the column 3 in that state can be attached to the attachment locations (the sample introducing unit 5 and the mass spectrometry unit 11).

(4) In addition, in the method for attaching the column 3 according to the present embodiment, by fastening the nut 21 to the length adjusting tool 23 in the positioning step, the ferrule 22 is sandwiched and positioned between the length adjusting tool 23 and the nut 21. In addition, in the heating step, the heating device 30 heats the ferrule 22 through the nut 21.

Therefore, the ferrule 22 can be positioned by a simple operation of fastening the nut 21 to the length adjusting tool 23.

In addition, since the ferrule 22 is heated through the nut 21, the ferrule 22 can be heated and fixed while the ferrule 22 is kept positioned.

Therefore, it is possible to fix the ferrule 22 at an appropriate position.

(5) In addition, according to the present embodiment, the heating device 30 includes the heating unit 302 having a shape corresponding to the shape of the nut 21.

Therefore, the nut 21 can be heated by the heating unit 302 of the heating device 30 in a state where the heating unit 302 is tightly fitted to the nut 21.

As a result, the nut 21 can be efficiently heated by the heating device 30 (heating unit 302).

4. Second Embodiment

Hereinafter, a second embodiment of the present invention will be described with reference to FIG. 4. Note that configurations identical to those in the first embodiment are denoted by identical reference numerals and therefore the description thereof will be omitted.

Figure 4:
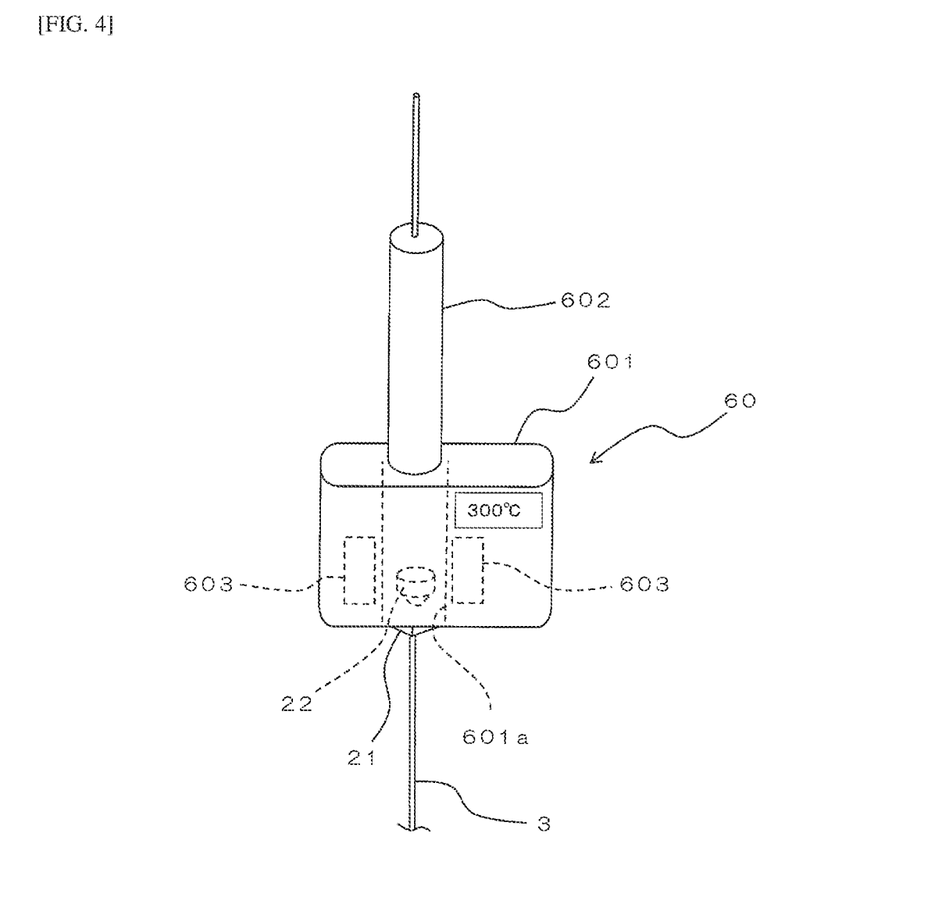
FIG. 4 is a view for explaining a column attaching method according to a second embodiment of the present invention.

FIG. 4 is a view for explaining a column attaching method according to the second embodiment of the present invention.

In the method for attaching a column 3 in the second embodiment, a heating device 60 is used in lieu of the length adjusting tool 23 and the heating device 30.

Specifically, in the second embodiment, after the above-described inserting step, the front end portion of the column 3 is inserted through the heating device 60.

The heating device 60 is a device for heating a ferrule 22 and adjusting the length of the column 3. The heating device 60 includes a main body 601, a length adjusting section 602 continuous with the main body 601, and a heating unit 603 provided in the main body 601.

An insertion hole 601a through which the column 3 is inserted is formed in the main body 601.

The length adjusting section 602 has a configuration similar to that of the length adjusting tool 23 according to the first embodiment, and a portion of the length adjusting section 602 is disposed in the insertion hole 601a of the main body 601.

The heating unit 603 is arranged around the insertion hole 601a in the main body 601. The heating unit 603 has a heater, not illustrated.

The front end portion of the column 3 is inserted through the insertion hole 601a of the main body 601 of the heating device 60, and the internal space of the length adjusting section 602. In addition, a nut 21 and the ferrule 22 are disposed in the insertion hole 601a of the main body 601 of the heating device 60 in a state where the column 3 is inserted through the nut 21 and the ferrule 22. Then, the ferrule 22 is sandwiched and positioned between the length adjusting section 602 and the nut 21 within the insertion hole 601a of the main body 601. At this time, the ferrule 22 contracts and is tightly fitted to the column 3.

In this state, the heater of the heating unit 603 is operated, and the ferrule 22 is heated through the nut 21 (heating step). Thus, the ferrule 22 is fixed to the column 3 by welding.

Then, the portion of the column 3 protruding from the length adjusting section 602 is cut (adjusting step). As a result, the front end position of the column 3 with respect to the ferrule 22 is adjusted.

Then, the heating device 60 is removed, and the nut 21 is attached to an attachment location in a manner similarly to that in the first embodiment.

As described, in the method for attaching the column 3 according to the second embodiment, the heating device 60 is used in lieu of the length adjusting tool 23 and the heating device 30. The heating device 60 includes the main body 601 and the heating unit 603. The insertion hole 601a through which the column 3 is inserted is formed in the main body 601. The heating unit 603 heats the ferrule 22 in a state where the column 3 is inserted through the ferrule 22, the column 3 being inserted in the insertion hole 601a.

That is, in the second embodiment, the heating unit 603 heats the ferrule 22 in a state where the column 3 inserted through the ferrule 22 is inserted in the insertion hole 601a of the main body 601 of the heating device 60. Thus, the ferrule 22 can be fixed to the column 3.

Therefore, the ferrule 22 can be fixed to the column 3 with a simple operation.

In addition, the heating device 60 includes the length adjusting section 602.

Therefore, the length of the column 3 can be adjusted by using the heating device 60.

5. Modification

In the above embodiments, a description has been given assuming that the column 3 is used in the gas chromatograph mass spectrometer 1. However, the column 3 may be used in a gas chromatograph. That is, one end portion of the column 3 may be attached to a detector constituted of a flame ionization detector (FID), a flame photometric detector (FPD), or the like.

In addition, in the above-described embodiments, a description has been given assuming that the portion of the column 3 protruding from the length adjusting tool 23 (the length adjusting section 602) is cut in the adjusting step. However, the column 3 may not be cut, and the length adjusting tool 23 (length adjusting section 602) may be slid so that the front end of the column 3 is aligned with the front end of the length adjusting tool 23 (length adjusting section 602). Then, the ferrule 22 may be tightly fitted to the column 3 and positioned while the front end of the column 3 is kept aligned with the front end of the length adjusting tool 23 (length adjusting section 602).

In addition, in the above-described embodiments, a description has been given assuming that the heating step is performed before the adjusting step. However, the heating step may be performed after the adjusting step.

In addition, in the above-described embodiments, a description has been given assuming that the nut 21 is fastened to the length adjusting tool 23 in the positioning step, and thus the ferrule 22 is positioned with respect to the length adjusting tool 23. However, the ferrule 22 may be positioned with respect to the length adjusting tool 23 by a method other than fastening of the nut 21.

What is claimed is:

1. A column attaching method comprising:
   inserting a column through a ferrule;
   heating, by a heating device that is different from a column oven for heating the column during an analysis, the ferrule through which the column is inserted and fixing the ferrule to the column via the heating, wherein the ferrule is heated through a nut; and
   attaching the column to which the ferrule is fixed, to an attachment location, after the heating,
   wherein the column is a capillary column, wherein the heating device includes a heater, and
wherein the attachment location is a portion of a mass spectrometer.

2. The column attaching method according to claim 1, wherein in the heating, the ferrule is heated in a state where the ferrule is tightly fitted to the column.

3. The column attaching method according to claim 1 further comprising:
positioning the ferrule through which the column is inserted, with respect to a length adjusting tool; and
adjusting a front end position of the column with respect to the ferrule which is positioned with respect to the length adjusting tool, wherein
in the heating, the ferrule is heated at one of a timing before the front end position of the column is adjusted and a timing after the front end position of the column is adjusted.

4. The column attaching method according to claim 3, wherein in the positioning, the nut is fastened to the length adjusting tool and the ferrule is sandwiched and positioned between the length adjusting tool and the nut.

5. The column attaching method according to claim 4, wherein
the heating device further includes an inner surface that has a shape following an outer shape of the nut, such that the heating device is configured to fit to the nut when heating the ferrule through the nut.

6. The column attaching method according to claim 1, wherein the heating device further includes a main body that has a through hole that is configured to accommodate the column and the ferrule while the column extends out of the main body via two ends of the through hole, and
wherein the heater is provided in the main body and is configured to heat the ferrule in a state where the column is inserted through the ferrule and the column and the ferrule are within the through hole.

7. A column attaching method comprising:
inserting a column through a ferrule;
heating, by a heating device that is different from a column oven for heating the column during an analysis, the ferrule through which the column is inserted and fixing the ferrule to the column via the heating, wherein the ferrule is heated through a nut; and
attaching the column to which the ferrule is fixed, to an attachment location, after the heating,
wherein the column is a capillary column,
wherein the heating device includes a heater, and
wherein the attachment location is a portion of a body configured to introduce a sample into the column.

8. A column attaching method comprising:
inserting a column through a ferrule;
heating, by a heating device that is different from a column oven for heating the column during an analysis, the ferrule through which the column is inserted and fixing the ferrule to the column via the heating, wherein the ferrule is heated through a nut; and
attaching the column to which the ferrule is fixed, to an attachment location, after the heating,
wherein the column is a capillary column,
wherein the heating device includes a heater, and
wherein the column is fixed to the attachment location while the column is in the column oven.

* * * * *